United States Patent
Galtarossa et al.

(10) Patent No.: US 10,330,525 B2
(45) Date of Patent: Jun. 25, 2019

(54) OPTICAL FIBER VIBRATION MEASUREMENT SYSTEM IN MULTIPHASE FLOWS WITH RELATED METHOD TO MONITOR MULTIPHASE FLOWS

(71) Applicant: Eni S.p.A., Rome (IT)

(72) Inventors: Andrea Galtarossa, Padua (IT); Luca Palmieri, Selvazzano Dentro (IT); Massimo Zampato, Salzano (IT)

(73) Assignee: Eni S.p.A., Rome (IT)

( * ) Notice: Subject to any disclaimer, the term of this patent is extended or adjusted under 35 U.S.C. 154(b) by 84 days.

(21) Appl. No.: 15/538,764

(22) PCT Filed: Dec. 23, 2015

(86) PCT No.: PCT/IB2015/059912
§ 371 (c)(1),
(2) Date: Jun. 22, 2017

(87) PCT Pub. No.: WO2016/103200
PCT Pub. Date: Jun. 30, 2016

(65) Prior Publication Data
US 2017/0336248 A1    Nov. 23, 2017

(30) Foreign Application Priority Data

Dec. 23, 2014   (IT) .......................... MI2014A002243

(51) Int. Cl.
*G01F 1/66*    (2006.01)
*G01H 9/00*    (2006.01)
(Continued)

(52) U.S. Cl.
CPC ......... *G01H 9/004* (2013.01); *G01D 5/35361* (2013.01); *G01F 1/661* (2013.01); *G01V 8/24* (2013.01); *G01V 11/002* (2013.01)

(58) Field of Classification Search
CPC .. G02B 27/005; G02B 21/0004; G02B 21/02; G02B 27/0025; G01N 29/28; G01N 29/2425; G01N 2291/104
(Continued)

(56) References Cited

U.S. PATENT DOCUMENTS 4,459,547 A    7/1984  Miller et al.
5,023,845 A *  6/1991  Crane .................... G01B 11/18
                                                        73/800
(Continued)

OTHER PUBLICATIONS

International Search Report for PCT/IB2015/059912 and Written Opinion dated Jun. 23, 2016, 13 pages.
(Continued)

*Primary Examiner* — Jacques M Saint Surin
(74) *Attorney, Agent, or Firm* — Abel Schillinger, LLP

(57) ABSTRACT

A vibration measurement system and relative method to monitor multiphase flows in extraction wells or conduits, by analysis of backscattered multimode fiber light comprising:
• a sensing multimode optical fiber; • an optical source, containing a high coherence laser that emits optical pulses to be sent in said sensing fiber; • a photonic lantern with 3 or more single-mode optical fiber ports and one multimode fiber port that is connected to the sensing multimode fiber; • an optical receiver, comprising a number of photodetectors equal to the number of the single-mode optical fiber ports of said photonic lantern minus 1, wherein each photodetector is connected to each of said single-mode ports; • a system for processing output signals from the optical receiver, the optical source being connected to one of the single-mode optical fiber ports and the other single-mode fibers being connected to the optical receiver. A process is also described for reconfiguring an optical reflectometry system already installed at a facility to be monitored.

6 Claims, 1 Drawing Sheet

(51) Int. Cl.
*G01D 5/353* (2006.01)
*G01V 11/00* (2006.01)
*G01V 8/24* (2006.01)

(58) Field of Classification Search
USPC ............................................................. 73/643
See application file for complete search history.

(56) References Cited

U.S. PATENT DOCUMENTS

| | | | |
|---|---|---|---|
| 5,600,133 A * | 2/1997 | Spillman, Jr. | G01N 29/2418 250/227.14 |
| 7,668,411 B2 | 2/2010 | Davies et al. | |
| 8,048,386 B2 * | 11/2011 | Dority | B01L 3/502 422/500 |
| 2007/0199696 A1 * | 8/2007 | Walford | E21B 43/2406 166/250.01 |
| 2009/0204346 A1 * | 8/2009 | Xie | G01F 1/66 702/45 |
| 2011/0048546 A1 * | 3/2011 | Bjorge | E21B 43/01 137/154 |
| 2014/0165709 A1 * | 6/2014 | Clements | G01N 3/12 73/49.5 |
| 2014/0208855 A1 * | 7/2014 | Skinner | G01H 9/004 73/655 |
| 2014/0209798 A1 | 7/2014 | Woodward et al. | |
| 2015/0199696 A1 * | 7/2015 | Carrender | G06Q 30/0201 705/7.29 |

OTHER PUBLICATIONS

Chan Ki Lee et al: "Photonic Lantern with Tapered Multi-core Fiber", Proceedings of the Twenty-fourth (2014) International Ocean and Polar Engineering Conference, Jun. 15, 2014, pp. 178-182.

Ozdur et al: "Performance improvements of photonic lantern based coherent receivers", 2014 IEEE Photonics Conference, IEEE, Oct. 12, 2014, pp. 368-369.

* cited by examiner

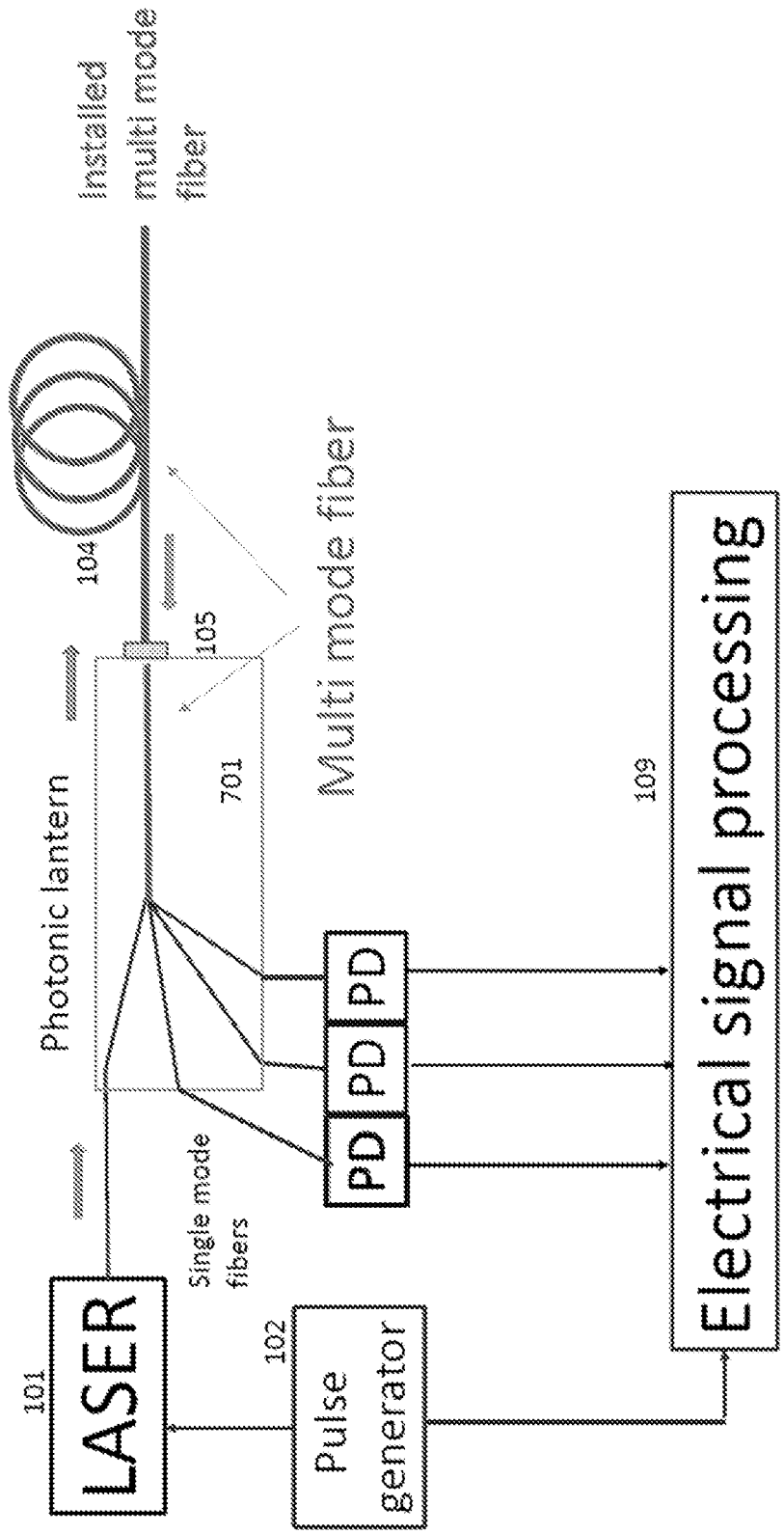

OPTICAL FIBER VIBRATION MEASUREMENT SYSTEM IN MULTIPHASE FLOWS WITH RELATED METHOD TO MONITOR MULTIPHASE FLOWS

The present invention relates to a vibration measurement system to monitor multiphase flows, in particular in extraction wells and conduits, based on the analysis of light backscattered by a multimode fiber.

Most non-optical techniques do not envisage direct interaction with the flow (except Venturi tubes and flow mixers). For example, solutions based on tomography envisage the use of gamma rays, X-rays or ultrasound; or microwave measurements of electrical impedance and dielectric constants. By their very nature these techniques are preferably performed at the surface, since they are difficult to implement on the wellhead, therefore do not provide an indication of the flow composition at the well inlet sections.

In literature, optical sensors are traditionally classified into "direct" and "indirect" ones. "Direct" sensors are those in which the electromagnetic radiation interacts directly with the flow, whereas in "indirect" ones, the electromagnetic radiation does not interact directly with the flow.

Direct sensors generally exploit different phenomena (total internal reflection, attenuation of the transmitted or evanescent wave, fluorescence) to estimate the flow composition, often also using spectroscopic techniques. Among the direct sensors there are also examples of optical tomography sensors.

In the case of indirect optical sensors, radiation is used to typically measure temperature variations and/or deformations induced on the sensor (whether it is a fiber, a resonant cavity or the like) by the structure of the well or even directly by the flow itself. It is highlighted that indirect sensors are typically limited to measuring temperature and/or deformation and from their measurement information can then be indirectly inferred on the flow parameters. In particular, deformation is connected with pressure or vibration measurements, where the separation between the two cases is often given by the frequency band of the observed phenomenon. Vibrations are also identified as acoustic energy and, in fact, one of the most innovative optical fiber vibration sensors is marketed as a distributed acoustic sensor. Information on the multiphase flow structure is finally obtained through appropriate physical models and the processing of the basic physical quantities measured. Although works in literature propose temperature measurement as the indirect solution for obtaining the composition of multiphase flows, recent patent activity seems to be more oriented towards measuring vibration.

It is appropriate within this context to underline the potential of distributed optical fiber sensors. Within the scope of measuring the local parameters of the multiphase flow, distributed temperature and vibration measurements are a great help, providing a continuous map with adequate space and time resolution of the whole well, making it possible to estimate the flow properties through appropriate calculation algorithms. It should be noted that such distributed measurements can be performed along the well only with technologies based on the use of optical fiber.

Within the well and in the immediate vicinity a number of optical fibers are often installed generally made of silica, in a parallel position to the well, of the multi-mode type with two typical uses: two-directional data transmission on the backbone well bottom-surface or distributed temperature measurement, typically with the Raman technique.

In U.S. Pat. No. 7,668,411 filed by Schlumberger Tech. Corp. a different use is proposed of such already installed fibers to make a distributed vibration sensor through the spatial analysis of the backscattered signal due to the Rayleigh effect.

The measurement device is a so-called OTDR (optical time domain reflectometer) which includes a high coherence pulsed optical source, typically a DFB laser; thanks to the spatial coherence of the laser source the backscattered signal due to the scattering points within the optical pulse induce an interference signal at the receiver. It is appropriate to highlight that the measurement of the vibration based on Rayleigh scattering would be easier if the fiber used was the single-mode type. On the other hand, the use of multimode fibers is more common along the well due to the higher tolerance to bends, the simpler connections and finally because distributed temperature measurement systems based on Raman diffusion actually use multimode fibers.

To overcome the non-optimal nature of the multimode fiber, the solution proposed in U.S. Pat. No. 7,668,411 envisages inserting a device, defined as "a single spatial mode filtering system", between the coherent OTDR and the multimode fiber (see FIGS. 3, 4, 5 and 6 of the patent). Also in said patent the single spatial mode filtering system is, for example, provided using a single-mode fiber or a pinhole in air.

The solution described in said patent has the following technical criticalities:

I The use of the single spatial mode filtering system (such as a single-mode fiber beam splitter) connected to the multimode fiber is a source of great attenuation of the measurement signal; the typical attenuation of a connection between a single-mode fiber and a multimode fiber can even reach 15 dB, causing great deterioration of the signal-noise ratio (SNR), and therefore limiting the maximum length of the measurement fiber, the spatial resolution, the spectral band of the vibrations or the sensitivity thereof. The loss of optical signal is even greater if, as suggested in U.S. Pat. No. 7,668,411, a pinhole in air is used to make the single spatial mode filter, II It is also possible that the single spatial mode filtering filter unpredictably selects a component of the backscattered signal (speckle) temporarily insensitive to the well vibrations. This problem is well known to persons skilled in the art and is described in U.S. Pat. No. 7,668,411; the same patent suggests overcoming the problem by selecting a different speckle. However, how this selection can be made is not described at all.

III Furthermore, the interpretation of the distributed vibration measurements can lead to criticalities. In fact, it should be remembered that the aim of the patent is to use the multimode fibers already installed in the wells for the above-highlighted objects of data transmission or temperature measurement, therefore not necessarily optimized for measuring vibration. On the other hand, multimode fibers are preferable to single-mode ones for installations along wells due to greater installation and connection simplicity. This aspect makes the configuration of the vibration measurement system sub-optimal, and makes it more complex to define accurate mathematical models for relating the vibration measurements taken to the properties of the multiphase flow.

A new system has now been found which offers a solution to the three problems listed above, proposing the elimination of the single spatial mode filtering system envisaged by U.S. Pat. No. 7,668,411, and interposing a "photonic lantern", with three or more single-mode optical fiber ports and a multimode fiber port, between the source, the multimode measurement fiber and the receiver. This guarantees a better signal-to-noise ratio which could be used to improve the dynamics, the resolution or the sensitivity.

In relation to the distributed measurement of vibrations in multimode fibers, the invention enables some intrinsic problems to the U.S. Pat. No. 7,668,411 solution to be overcome. Specifically, the innovation allows insertion losses due to the coupling between the single spatial mode filtering system and the multimode fiber to be minimized, hence improving the measurement quality. Furthermore, the innovation allows various speckles of the backscattered signal to be monitored at the same time, hence being intrinsically immune to the problem of individual speckle fading, which does affect the U.S. Pat. No. 7,668,411 system.

The reflectometric system for vibration measurement according to the present invention, to monitor multiphase flows, particularly in extraction wells or conduits, by analysis of backscattered multimode fiber light, comprises:
 a sensing multimode optical fiber;
 an optical source, containing a high coherence laser that emits optical pulses to be sent in said sensing fiber;
 a "photonic lantern" with 3 or more single-mode optical fiber ports, and one multimode fiber port connected to the sensing multimode fiber;
 an optical receiver, comprising a number of photodetectors equal to the number of single-mode optical fiber ports of said photonic lantern minus 1, wherein each photodetector is connected to each of said single-mode ports;
 a system for processing output signals from the optical receiver,
the optical source being connected to one of the single-mode optical fiber ports and the other single-mode fibers being connected to the optical receiver.

The system preferably envisages:
 the optical source having two output ports, emitting at a first port an optical signal at a first frequency and at a second port an optical signal at a second frequency, different from said first frequency;
 the optical receiver including a light splitter with 1 input and a number of outputs equal to the number of photodetectors, and also including a number of optical combiners equal to the number of photodetectors, where:
  the input port of said splitter being connected to said second port of the optical source;
  each output port of said splitter being connected to each combiner;
  each combiner being connected to each of said photodetectors.

A further subject matter of the present application is the method for measuring vibrations along a structure through the system as specified above, which comprises:
 finding a sensing multimode optical fiber installed along the structure to be monitored;
 launching an optical signal in said optical sensing fiber;
 selecting more than one speckle of the light backscattered from the sensing fiber by Rayleigh scattering induced by the launched pulse;
 generating from the multiple speckles collected by the fiber a signal indicative of the vibrations along the monitored structure.

Said method may also comprise the use of a multimode fiber to convey the backscattered light towards the optical receiver.

A further subject matter of the present application is the process for reconfiguring an optical time domain reflectometry system already installed at the structure to be monitored.

The mapping of vibrations along the well may be performed non-invasively with a reflectometry technique based on coherent Rayleigh scattering, using optical fibers already installed. In particular the backscattered signal is analyzed and using two or more receivers in parallel various speckles related to the interference of different modes can be processed, each with a space and time trend that varies according to external disturbance, typically mechanical tension, temperature and vibrations. While mechanical tension and temperature have slow variations, vibrations by their very nature vary quickly along the well, both in time and space, which makes it easier to identify them and subsequently analyze them. Reflectometry analysis allows the spatial snapping (along the well) of temperature, strain and vibrations and allows malfunctioning, variations in the multiphase flow composition, the development of throttling following deposition of hydrates, etc. to be identified in real time.

As already mentioned, vibration measurement is more accurate if it is performed on single-mode fiber, therefore, if the multimode fibers already installed in the wells are to be used, lower performance levels than the optimal solution must be accepted. The innovative idea consists also of the exploitation of the same multimode fiber to interrogate point sensors installed along the well, in order to integrate distributed vibration measurement with other physical parameters. Such point sensors can also be installed during well maintenance, possibly as objects already integrated into specific components of the well itself (e.g. valves, etc.).

The measured parameter could still be vibration, but localized in the sensor application point, or total internal reflection, for the purpose of the direct analysis of the two- and three-phase flow as already described in the state of the art. Individual sensors could be addressed through wavelength multiplexing techniques, so that the same multimode fiber could be used to take the distributed vibration measurement and to interrogate the point sensors at the same time.

The process in accordance with the invention to reconfigure an optical reflectometry system, comprising a multimode sensing optical fiber installed along said structure, a source for launching optical signals into said multimode sensing fiber, an optical receiver to receive the light backscattered by said sensing fiber by Rayleigh scattering induced by the launched pulse, substantially comprises the interposition between the sensing fiber and the optical receiver of a "photonic lantern" to spatially separate multiple speckles of light backscattered by Rayleigh scattering, each output of which is connected to a photodiode.

Said process may also comprise generating a signal indicative of the vibration along the monitored structure, by means of an analysis system based on the multiple speckles recorded.

To better define the invention an example is shown that demonstrates the effectiveness of the proposed system.

EXAMPLE 1

The diagram is shown in FIG. 1.

A high coherence laser 101 with emission wavelength typically comprised between 800 and 1650 nm (preferably between 1300 and 1650 nm), controlled by an external pulse generator 102, emits optical pulses typically lasting 3-200 ns (preferably 20-100 ns) with repetition frequency of at least 1 kHz, is coupled to one of the input ports of a "photonic lantern"; the other input ports of the photonic lantern are connected to 1 or more photodiodes (PDs), which give out electrical signals proportional to the respective optical input speckles. The multimode output port of the photonic lantern is connected to the multimode sensing fiber.

The invention claimed is:

1. Reflectometric system for vibration measurement to monitor multiphase flows by analysis of the light backscattered by multimode fiber comprising:
   a sensing multimode optical fiber;
   an optical source, containing a high coherence laser that emits optical pulses to be sent in said sensing multimode optical fiber;
   a photonic lantern with three or more single-mode optical fiber ports, and one multimode optical fiber port connected to said sensing multimode optical fiber;
   an optical receiver comprising a number of photodetectors equal to the number of said single-mode optical fiber ports of said photonic lantern minus one, wherein each said photodetector is connected to each of said single-mode optical fiber ports;
   a system for processing output signals from said optical receiver;
   wherein said optical source is connected to one of said single-mode optical fiber ports and other single-mode fibers are connected to said optical receiver.

2. A method for vibration measurements along a structure to be monitored comprising:
   providing said system of claim 1;
   finding said sensing multimode optical fiber installed along the structure to be monitored;
   launching an optical signal of said optical pulses in said sensing multimode optical fiber;
   selecting with said photonic lantern multiple speckles of light backscattered from said sensing multimode optical fiber by Rayleigh scattering induced by the launched optical signal;
   generating from the multiple speckles collected from said photonic lantern a signal indicative of the vibrations along the structure to be monitored.

3. A method for reconfiguring said reflectometric system according to claim 1, wherein said sensing multimode optical fiber is already installed at a structure to be monitored, comprising said optical source for launching said optical pulses in said sensing multimode optical fiber, said optical receiver for receiving light backscattered by said sensing multimode optical fiber by Rayleigh scattering induced by the launched optical pulses, comprising interposing said photonic lantern between said sensing multimode optical fiber and said optical receiver to spatially separate multiple speckles of the light backscattered by Rayleigh scattering.

4. The method according to claim 3 comprising generating a signal indicative of the vibration along said structure, using an analysis system that processes output signals from said optical receiver based on the multiple speckles recorded.

5. The system according to claim 1, wherein:
   said optical source has two output ports, emitting at a first said output port an optical signal at a first frequency and at a second said output port an optical signal at a second frequency, different from said first frequency;
   said optical receiver includes a light splitter with one input port and a number of output ports equal to the number of said photodetectors, and also includes a number of optical combiners equal to the number of said photodetectors, where:
   the input port of said light splitter is connected to said second output port of said optical source;
   each output port of said light splitter is connected to each said combiner;
   each said combiner is connected to each of said photodetectors.

6. The method according to claim 2 further comprising using said sensing multimode optical fiber to convey the backscattered light towards said optical receiver.

* * * * *